United States Patent Office 2,843,601
Patented July 15, 1958

2,843,601
DIOXANES

Nicholas B. Lorette, Lake Jackson, Tex., assignor to The Dow Chemical Company, Midland, Mich., a corporation of Delaware No Drawing. Application November 5, 1956
Serial No. 620,183

3 Claims. (Cl. 260—340.6)

The present invention is concerned with the dioxanes having the formula

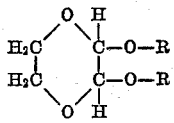

wherein R represents an alkyl radical selected from the group consisting n-pentyl and isopentyl. These new compounds are liquids, somewhat soluble in many organic solvents and of very low solubility in water. They have been found to be active as plant growth control materials and are adapted to be employed as active toxic constituents of compositions for the control of the growth and the killing of weeds and for the sterilization of soil with regard to the growth of plants.

The new dioxane compounds may be prepared by mixing or otherwise blending together a 2,3-dichloro-p-dioxane and n-pentanol or isopentanol at a reaction temperature at which chloride of reaction is formed from the chlorine of the 2,3-dichloro-p-dioxane reactant. This chloride appears in the reaction mixture as hydrogen chloride. The reaction conveniently may be carried out in an inert organic solvent such as toluene, benzene or carbon tetrachloride. Good results are obtained when one molecular proportion of 2,3-dichloro-p-dioxane is reacted with two or more molecular proportions of the alkyl alcohol reactant. The reaction proceeds smoothly with the formation of the desired product and hydrogen chloride of reaction at temperatures of from 70°–100° C. In carrying out the reaction, substantially all the chlorine of the 2,3-dichloro-p-dioxane reactant may be recovered as hydrogen chloride. Upon completion of the reaction as is evidenced by the substantial cessation of the evolution of hydrogen chloride, the desired product may be separated by fractional distillation under reduced pressure.

The following examples illustrate the invention but are not to be construed as limiting:

*Example 1.—2,3-di(isopentyloxy)-p-dioxane*

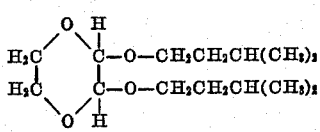

One and one-half moles of 2,3-dichloro-p-dioxane dissolved in 200 milliliters of carbon tetrachloride was mixed with 4 moles of isopentyl alcohol and the resulting mixture heated at the boiling temperature and under reflux until no further substantial amounts of hydrogen chloride of reaction were evolved. The heating was carried out at the temperature of 76° C. and over a period of 16 hours. Following the heating period, the reaction mixture was fractionally distilled under reduced pressure to obtain a 2,3-di(isopentyl-oxy)-p-dioxane product boiling at 130° C. at 5 millimeters pressure. The product had a refractive index n/D at 25° C. of 1.4365 and a specific gravity at 25°/25° C. of 0.966.

*Example 2.—2,3-di(n-pentyloxy)-p-dioxane*

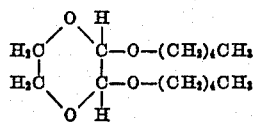

6.2 moles of n-pentyl alcohol was mixed with two moles of 2,3-dichloro-p-dioxane and the resulting mixture heated at the boiling temperature and under reflux until the evolution of hydrogen chloride of reaction had substantially ceased. The heating was carried out at a temperature of 88° C. for 17 hours. Following the heating period, the mixture was fractionally distilled under reduced pressure to obtain a 2,3-di(n-pentyloxy)-p-dioxane product boiling at 141° C. at 5 millimeters pressure. The product had a refractive index n/D of 1.4377 at 25° C. and a specific gravity at 25°/25° C. of 0.971.

The new dioxane products are effective as herbicides for the control and prevention of the growth of plants. For such use the products may be dispersed on an inert finely divided solid and employed as dusts. Also, such mixtures may be dispersed in water with the aid of a wetting agent, and the resulting aqueous suspension employed as sprays. In other procedures, the products may be employed as constituents of oil-in-water emulsions or water dispersions with or without the addition of wetting, dispersing or emulsifying agents. In representative operations, 2,3-di(isopentyloxy)-p-dioxane gave 100 percent controls of the growth of the germinant seeds and emerging seedlings of Japanese millet when distributed in soil at a dosage of 50 pounds per acre.

I claim:
1. A dioxane having the structure

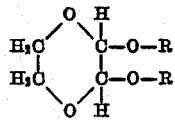

wherein R is a radical selected from the group consisting of n-pentyl and isopentyl.
2. 2,3-di(n-pentyloxy)-p-dioxane.
3. 2,3-di(isopentyloxy)-p-dioxane.

References Cited in the file of this patent

UNITED STATES PATENTS

| | | |
|---|---|---|
| 2,331,993 | MacDowell et al. | Oct. 19, 1943 |
| 2,725,332 | Buntin | Nov. 29, 1955 |

OTHER REFERENCES

Boeseken et al.: "Rec. Trav. Chem.," vol. 57, pp. 73–8 (1938).